March 22, 1960    M. WEBER    2,929,273
VARIABLE-SPEED FRICTION DRIVE
Filed May 11, 1956    2 Sheets-Sheet 1
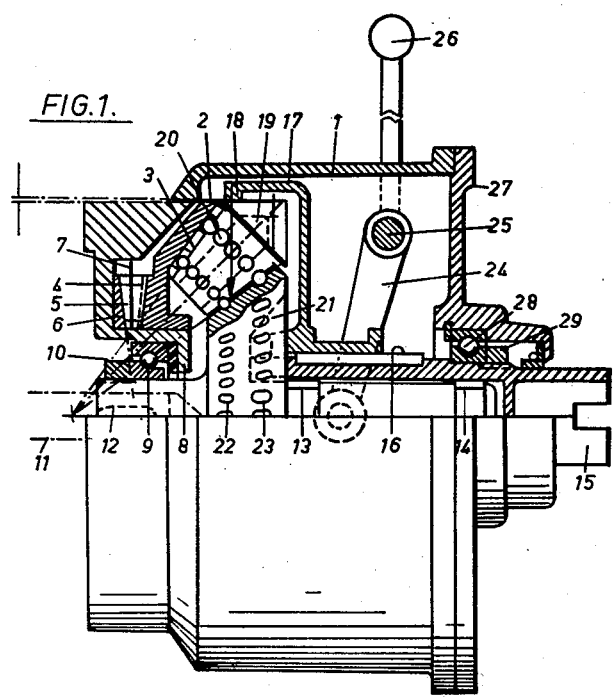
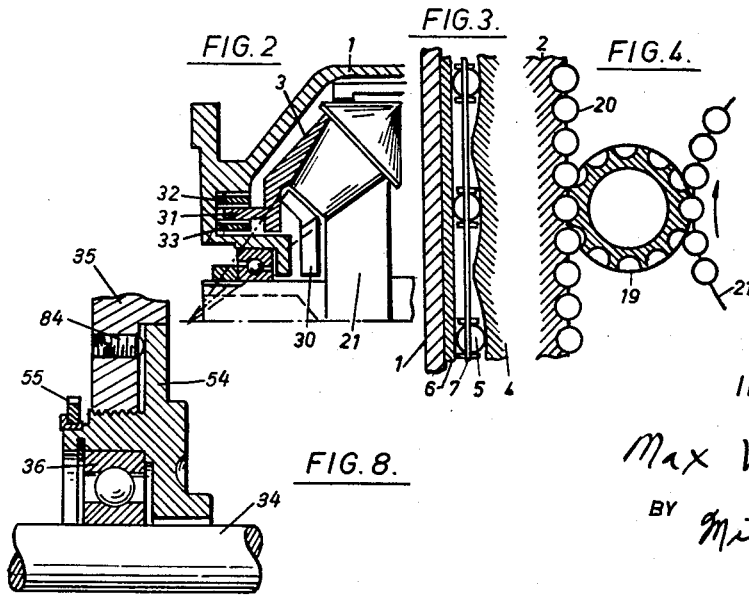
INVENTOR:
Max Weber
BY Michael S. Striker
Agt.

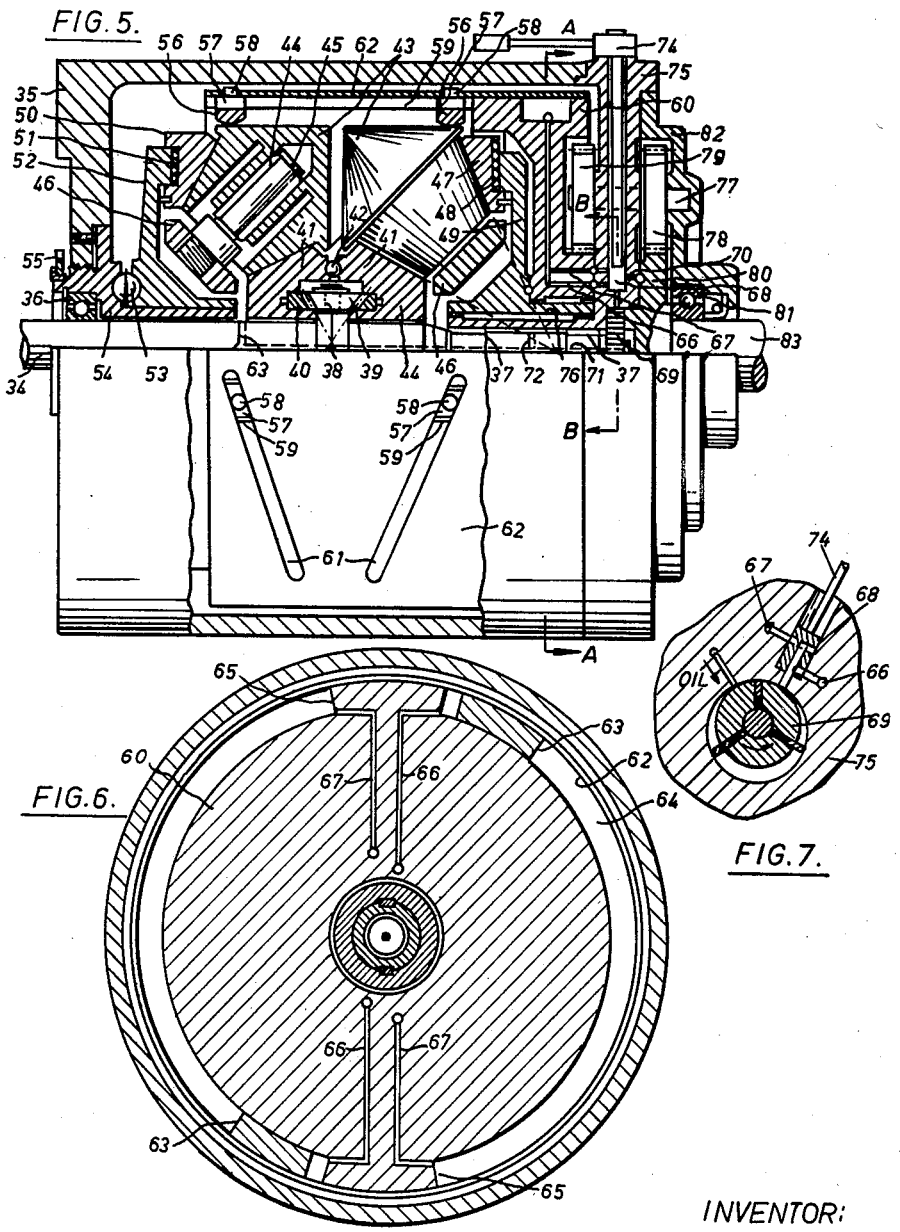

United States Patent Office 2,929,273
Patented Mar. 22, 1960

2,929,273

VARIABLE-SPEED FRICTION DRIVE

Max Weber, Uberlingen (Bodensee), Germany

Application May 11, 1956, Serial No. 584,235

Claims priority, application Germany May 12, 1955

9 Claims. (Cl. 74—796)

The invention relates to a variable-speed friction drive and more specifically to a drive comprising planetary bevel gears and load-responsive thrust couplings.

One object of the invention is to provide a friction drive with continuously variable transmission ratio, which is adapted to transmit large torques particularly at low speeds and which has a high load carrying capacity at standstill.

Another object of the invention is to operate two or more of the friction drive units in parallel and to use differential drive means to allow for differences occurring at the output speeds of the drive units.

A further object of the invention consists in transmitting axial thrusts and tensions to a single thrust bearing so that the gear housing remains substantially free from tensions. An important feature of the drive is that means are provided to release the outer bearings of stresses arising by the contact pressure acting on the transmitting surfaces.

A further object of the invention is to provide simple means such as corrugated thrust plates to provide friction pressures proportional to the load transmitted.

A still further object of my invention is to apply a tooth system to the planetary gear members whereby the lifetime of the gear is increased.

These and other objects of the invention will be apparent in reading the specification and in examining the drawings forming part of the present invention.

Figure 1 is a side view of the roller drive, partly in section;

Figure 2 shows a further embodiment of the roller drive with the load-responsive coupling;

Figure 3 is a layout of a thrust bearing with corrugated thrust plate;

Figure 4 shows details of a roller drive with a tooth system in reciprocal arrangement to that of Fig. 1;

Figure 5 is a side view of a twin roller drive with differential gear, partly represented in section;

Figure 6 is a cross sectional view along line A—A of Fig. 5;

Figure 7 is a partial sectional view taken along the line B—B of Figure 5, drawn to an enlarged scale; and Figure 8 is a partial sectional view of a construction detail shown in Figure 5 and drawn to an enlarged scale.

In Figure 1 a thrust cone 2 is rotatably mounted in the housing 1 of the friction drive. The motor shaft 11 is splined at 12 to the journal 21a of the drive wheel 21 rotatably mounted in a thrust roller bearing 9 of the housing 1. The frusto-conical portions of the taper rollers 19 are in driving contact with the drive wheel 21 and the thrust cone 2 which is pre-loaded by an annular resilient washer 8, thrust roller bearing 9, and nut 10. Nut 10 is screwed on to journal 21a.

The thrust cone 2 is provided at an annular portion 4 thereof with a corrugated ring face 2a abutting intermediate tapered rollers 5 against a thrust ring 6 located in the housing 1. The rollers 5 are guided in a cage 7.

The axle 21b of the drive wheel 21 is rotatably supported on needle roller bearings 13 and 14 within the hollow output shaft 15. Shaft 15 is rotatably mounted on the roller bearing 28, the inner ring of which is secured to shaft 15 by a nut 29. The outer ring is located in the housing 1.

The hub 17a of the driven wheel 17 is axially shiftable on the output shaft 15 and is non-rotatably secured thereon by splines 16. The driven wheel 17 is provided with an internal friction ring 18 being in driving contact with the conical portion 19a of the rollers 19. The driving surface of the internal friction ring 18 is slightly deformable to secure good frictional engagement between the rolling surfaces. The driven wheel 17 can be shifted along its axis of rotation by operating the lever 26 secured to the shaft 25, a forked lever 24 secured to shaft 25 engaging a ring recess in the hub 17a of the driven wheel 17.

As the friction ring 18 is shifted from right to left along the frictional surface of the cones 19a, the speed of the driven wheel 17 is increased. The line of contact of cone 19a with the friction ring 18 of the driven member 17 is inclined by an angle $a$ to the axis of rotation of wheel 17. Thus, an axial thrust is exerted on wheel 17 tending to drive wheel 17 back into its extreme right position. If a torque is applied to shaft 15 the frictional reactive torque exerted on the rollers 19 tends to rotate the thrust cone 2. This rotation is opposed by the thrust coupling 4 to 7 which effects an increased axial thrust on the cone 2 intermediate the corrugations of ring 2a. This increased thrust tends to shift the rollers 19 along their axis of rotation. As a result, the pressure between roller cones 19a and ring 18 and therefore the transmissible friction torque is increased proportional to the load transmitted to the output shaft 15. The thrust coupling 4 to 7 is of the non-self-locking type.

In order to keep the taper rollers 19 in equal distance from each other and to avoid tilting of same a tooth system 2, 3, 20, 22, 23 may be applied to the roller drive. To this end the cone 2 carries a lining 3 having semi-spherical recesses arranged along two diameters. The conical surface of wheel 21 has two rows of slightly oblong recesses 22 and 23. The rollers 19 have protuberances 20 engaging with the recesses on 3 and 21. The oblong form of the recesses 22 and 23 allow for a slight axial displacement of the taper rollers 19 which compress the deformable contact surface of ring 18.

Figure 2 illustrates some modifications applied to the supporting means for the taper rollers 19. These are guided in a ring 30 floating on the journal 21a of the drive wheel 21. The thrust cone 2' is supported axially by two coupling members 32 and 33 having threads of opposite pitch and acting on the thread ring 31 which is integral with the thrust cone 2'. The thread ring 31 has an external thread and an internal thread of opposite pitch.

Figure 3 illustrates some further details of the thrust coupling 4 to 7 on an enlarged scale. The corrugated surface 2a on the portion 4 of the thrust cone 2 abuts on a row of rollers 5 guided in the cage 7 and being supported by the conical face of the thrust ring 6. If an increased torque resulting from an increased load on the output shaft 15 is exerted on the corrugated ring 4 of thrust cone 2, the latter rotates slightly in a clockwise direction or reversely, whereby the rollers 5 climb the ascending portions of the corrugations. Therefore, a thrust is exerted on the thrust cone 2 which as a result is shifted by a small amount to the right, as viewed in Fig. 1, till the rollers have reached the top of the corrugations.

The operation of the device is as follows:

The set of taper rollers 19 is pre loaded axially through the thrust bearing 9 and resilient washer 8 by screwing-on nut 10 to the journal 21a. Thereby the two parts of the thrust coupling are centrally pressed together. The forces exerted by the drive wheel 21 and the thrust cone 2 cause the rollers 19 to be pressed against the friction ring 18.

If a torque is transmitted to the output shaft 15, a reactive force is transmitted through the rollers 19 to the thrust cone 2 which tends to rotate in the sense of the reaction force. As a result, the rollers 5 roll along ring 6 and climb the slope of the corrugations on face 2a of member 2. Thus, an axial thrust acts upon thrust cone 2. The thrust is translated into an axial force acting on the rollers 19, which are displaced along their axis by a small amount. As a result, an additional pressure proportional to the torque transmitted to the output shaft 15 is exerted on the friction ring 18 which, because of the increased pressure of contact is adapted to transmit a higher load.

As a result of the inclination of the generator line of cone 19a to the gear axis the frictional contact surfaces are pressed together with an additional force which enables the taper rollers 19 to transmit a torque increasing proportional to the transmission ratio.

The taper rollers 19 can be hollow to decrease their moment of inertia. The thrust coupling 4 to 7 and the friction drive 2, 17, 18, 19, 21 are adapted to operate the output shaft 15 in both directions of rotation. Furthermore, input and output sides of the gear may be interchanged. Thus, shaft 15 being driven by a motor and journal 21a being the output shaft.

Figures 5 and 6 illustrate a further embodiment of the invention in which two gear units of the kind described hereinbefore are operated in parallel, the two drive cones 41 being moved by a differential gear 93, 40. Parts in Figure 5 taking mirror-image positions are designated by like reference numbers.

In Figure 5 34 is the driving shaft which is rotatably mounted in a roller bearing 36 secured to the housing 35 and in two needle roller bearings 37 located in the cover 75 of the housing 35. The shaft 34 carries a planetary wheel 39 rotatably mounted on a stub axle 38 of the shaft 34 and meshing with the two crown wheels 40. The crown wheels 40 are each secured to one of the drive wheels 41 abutting face to face on a fixed bearing 42.

Two sets of taper rollers 43 provided are in driving contact with the drive wheels 41, one roller of the left set being shown in section, and one roller of the right set in a side view. The rollers are respectively rotatably mounted and axially displaceable on axles 45 intermediate needle roller bearings 44 as shown in the sectioned roller of Fig. 5. The axles 45 are secured to guide rings 46 which respectively float in the lateral thrust members 49 and 52.

The left taper rollers 43 roll along a stationary thrust cone 50 which abuts laterally on the thrust member 52 through an elastic washer 51 securing an equal thrust distribution around the circumference of thrust cone 50. A thrust coupling 54 of similar construction as the coupling 4 to 7 of Figure 1 but having balls 53 instead of the conical rollers used in the embodiment shown in Figure 1 exerts a torque-responsive thrust on the cones 50 and 47. The thrust cone 47 is laterally supported through an elastic washer 48 of a thrust member 49 abutting against the fixed cover 75 of the housing 35. The twin gear unit 50, 43, 41, 42, 41, 43 and 47 is pre-loaded in a similar manner as the gear unit shown in Figure 1. As clearly shown in Figure 8 the thrust coupling 54 threadingly engages the housing 35, so that the thrust coupling will be moved in axial direction by turning the same about the axis thereof. A gear ring 55 is fixed to the outer left portion, as viewed in Figure 8, of the thrust coupling 54, which can be engaged by an appropriate key to facilitate in this way the turning of the thrust coupling 54. After the thrust coupling 54 has been moved in axial direction to provide for the desired pre-load of the twin gear unit, the position of the thrust coupling 54 is fixed by a set screw 84 screwed in a threaded hole of the housing 35 and engaging with the end thereof the thrust coupling 54.

The friction rings 56 are provided with square blocks 57 which glide in axial slots 59 of the driven wheel 60. The blocks 57 are adapted to transmit the torque from the friction rings 56 to the driven wheel 60. Followers 58 fixed to the blocks 57 are guided in oblique slots 61 of a hollow cylinder 62 turnably mounted on the outer surface of the driven wheel 60. Hydraulically operated pistons 63 fixed to the hollow cylinder 62 are respectively adapted to move in semi-circular grooves 64 (Fig. 6) formed in the outer cylindrical surface of wheel 60. Bores 66 and 67 are adapted to feed oil under pressure from a feed pump 69 to opposite ends of the grooves 64, respectively. The oil flow through the bores 66, 67 is regulated by a valve 68, which in turn is controlled by a hand lever 74 which is operated to admit oil under pressure to turn pistons 63 and cylinder 62 connected thereto selectively in a clockwise or counter clockwise direction. Figure 7 shows the oil pump 69 and the control valve 68 in further detail. In the position of the control valve 68 as shown in Figure 7 the oil pump 69 will pump oil through the bores 66 into the cavities 64 shown in Figure 6 to one side of the pistons 63 so that these pistons and the hollow cylinder 62 connected thereto will be turned in clockwise direction. The oil contained in the cavities 64 on the other side of the piston 63 will in this position of the control valve 68 flow through the bores 67 back to the oil sump. When the position of the valve 68 is reversed by turning the same by means of the handle 74, oil under pressure will flow through the bores 67 into the cavities and through the bores 66 from the cavities to the oil sump. In this case the pistons 63 and the hollow control cylinder 62 connected thereto will be turned in counter-clockwise direction. When the cylinder 62 is turned, followers 58 glide in the oblique slots 61 and move the friction rings 56 in the axial slots 59 towards the tips of the cones 43, or in the reverse. Thus, the transmission ratio can be changed continuously from forward speed through zero speed to the reverse, by shifting the friction rings 56 from their extreme inward position to the outward position, as illustrated in Figure 5.

The cover 75 of the housing 35 contains two spur gears 78 and 79 fixed on a rotatable shaft 77. Gear 79 meshes with a gear ring cut on the driven wheel 60, and gear 78 engages the output pinion 80 integral with the output shaft 83, which is rotatably mounted on a roller bearing 81. Mounted on the outer surface of the cover 75 is a cover plate 82 which provides a bearing for the shaft 77 and which supports the roller bearing 81.

The rotating single or twin roller units are loaded axially during service and at standstill. As a result of the force components acting axially on the roller members 19, 43 these rollers press against the friction rings 18, 56, thus increasing the adhesive force between the contact surfaces. The load transmitting surfaces of the friction members are preferably coated with plastic material of high frictional coefficient. The surface of the tapered drive heads 19a, 43a can be serrated for further increasing the adhesive forces.

The axial loading of the conical drive members has a damping effect on vibrations arising on the rotating members. In order to increase this damping effect and, in the same time decrease the moment of inertia, the taper rollers 43 are hollow. A further damping effect is reached by providing a thrust coupling 52, 53, 54 with the thrust member 52 designed as an elastic plate similar to a cup spring. If the transmitted torque becomes zero, the thrust coupling operates as an elastic diaphragm and is in tune with the vibrations occurring to the gear, so that frictional contact between the gear members is maintained at all conditions of service.

It will be understood that minor changes may be made in the construction and arrangement of the several parts without departing from the spirit and scope of the present invention.

Having thus described my invention, I claim:

1. A variable-speed power transmission comprising a fixed housing; at least one conical drive member rotatably mounted in said housing; at least one thrust cone mounted in said housing coaxial with said drive member; a plurality of taper rollers, each formed by two cones of inverse slope, the first of said cones of said taper rollers being located between said drive member and said thrust cone and forming planetary gears with said drive member and said thrust cone; a driven member mounted in said housing coaxial with said drive member and having an annular contact surface means in frictional driving contact with the tapered surfaces of the second of said cones of said taper rollers; means to shift said annular contact surface means parallel to the axis of said driven member; means for providing an axial pre-load on the planetary gear members; and means for applying an axial thrust on said planetary gear members proportional to the torque transmitted, whereby the frictional contact between said taper rollers and said annular contact surface means of said driven member is increased when the torque to be transmitted by the power transmission increases.

2. A power transmission according to claim 1, wherein said thrust cone is axially shiftable and rotatably mounted in said housing, and wherein said means for applying an axial thrust on said planetary gear members comprises a corrugated ring coaxial with the axis of said drive member and fixed to said thrust cone, a thrust plate fixed to and abutting against said housing, and a plurality of rolling elements located between said corrugated ring and said thrust plate and being in rolling contact therewith, the corrugations in said corrugated ring being adapted to provide an axial thrust component on said thrust cone proportional to the torque transmitted by the transmission and the inclination of said corrugations being formed so as to prevent self-locking between said thrust cone and said housing.

3. A power transmission as defined in claim 1, wherein the planetary gear members are respectively provided with tooth means adapted to secure positive power transmission between the planetary gear members and to permit slight displacement of said taper rollers in axial direction thereof.

4. A power transmission as defined in claim 3, wherein the tooth means comprise at least one row of hemispherical protuberances projecting from each of said taper rollers and two rows of elongated recesses respectively formed in said drive cone and said thrust cone and meshing with said protuberances, whereby said elongated recesses will permit an axial displacement of the taper rollers.

5. A power transmission as defined in claim 1, wherein the taper rollers are arranged in such a position that the angle between the line of contact of the taper roller with the contact surface means of the driven member and the axis of said taper roller is smaller than the angle between the axis of said taper roller and the axis of the drive member.

6. A power transmission comprising a housing; a drive shaft; two drive cones; two thrust cones turnably mounted on said drive shaft; two sets of taper rollers respectively located between and in frictional contact with said drive cones and said thrust cones, said drive cones, taper rollers and thrust cones forming two planetary gears adapted to be operated in parallel; a differential gear driven by said drive shaft and contacting said drive cones to drive the latter; a driven member rotatably mounted in said housing coaxial with said drive shaft; a pair of rings mounted on said driven member for simultaneous movement parallel to the drive shaft axis, each of said rings having an annular contact surface in contact with said taper rollers, respectively; and a pair of thrust plates respectively supporting said thrust cones.

7. A power transmission as defined in claim 6, wherein the two planetary gears are arranged with bilateral symmetry on said drive shaft with the axes of said taper rollers inclined in opposite directions, wherein said two rings are shiftable simultaneously and in opposite directions so as to contact said taper rollers respectively at points of substantially equal circumferential speed, and wherein one of the two thrust plates supporting said thrust cones abuts against a torque responsive coupling and the other of said thrust plates abuts against said housing; and including means located between said thrust coupling and said housing for applying a pre-load on both planetary gears.

8. A power transmission as defined in claim 7, and including a control cylinder rotatably mounted on said driven member and being formed with a plurality of oblique slots; a plurality of square blocks respectively mounted on said rings and guided in axial slots in said driven member, each of said blocks having a follower guided in said oblique slots, respectively; and control means for rotating said control cylinder selectively in opposite directions relative to said driven member for shifting said rings to vary the transmission ratio of the power transmission.

9. A power transmission as defined in claim 8, wherein the control means include at least one cavity defined by a groove formed in the driven member and extending in circumferential direction thereof and closed by an annular portion of said control cylinder mounted thereon, a hydraulic piston fixed to said cylinder and located in said cavity, an oil feed pump mounted in said housing, oil bores in said driven member communicating with said cavity, ring grooves in said driven member and in said housing and communicating with said oil feed pump and said bores in said driven member, and hand operated distribution valve means mounted in said housing for controlling the flow of oil through said bores and said ring grooves so that said control means is capable of shifting said control cylinder by means of said hydraulic piston selectively in both directions of rotation with respect to said driven member to shift said rings and to vary thereby the transmission ratio of the power transmission.

References Cited in the file of this patent

UNITED STATES PATENTS

| | | |
|---|---|---|
| 1,887,505 | Gibson | Nov. 15, 1932 |
| 2,408,666 | Mallard | Oct. 1, 1946 |
| 2,759,375 | Legros | Aug. 21, 1956 |

FOREIGN PATENTS

| | | |
|---|---|---|
| 182,150 | Switzerland | Apr. 16, 1936 |
| 448,464 | Italy | May 18, 1949 |
| 1,002,836 | France | Nov. 7, 1951 |
| 713,582 | Great Britain | Aug. 11, 1954 |
| 1,111,217 | France | Oct. 26, 1955 |
| 313,221 | Switzerland | May 15, 1956 |